(No Model.)

W. MACMILLAN.
GALVANIC BATTERY.

No. 454,057. Patented June 16, 1891.

Witnesses
Geo. W. Breck
Edward Thorpe

Inventor
William MacMillan
By his Attorneys
Witter & Kenyon

UNITED STATES PATENT OFFICE.

WILLIAM MACMILLAN, OF NEW YORK, N. Y.

GALVANIC BATTERY.

SPECIFICATION forming part of Letters Patent No. 454,057, dated June 16, 1891.

Application filed October 17, 1890. Serial No. 368,424. (No model.)

*To all whom it may concern:*

Be it known that I, WILLIAM MACMILLAN, a subject of the Queen of Great Britain, and a resident of New York city, New York, have invented certain new and useful Improvements in Galvanic Batteries, of which the following is a specification, reference being had to the accompanying drawings, forming part hereof.

This invention relates to galvanic batteries for generating electric currents, and has for its object to improve the construction of such batteries.

The invention consists of certain improvements in the construction of the porous cells and in the construction of the negative elements, and the combination with such elements of improved depolarizers.

It also consists of an improved construction of receptacle for transporting the battery materials adapted to be used in combination with a cup or cell of the battery.

Portions of my invention are especially adapted for batteries having a single fluid and a negative element consisting of a carbon plate and pieces of carbon packed around it, such as sal-ammoniac batteries.

Figure 1:
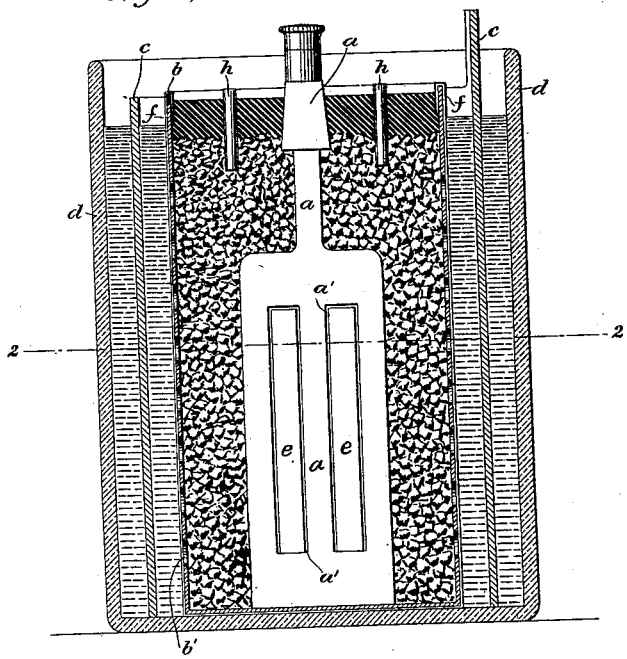
Figure 3:
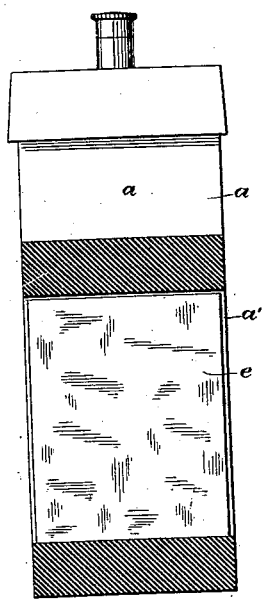
Figure 2:
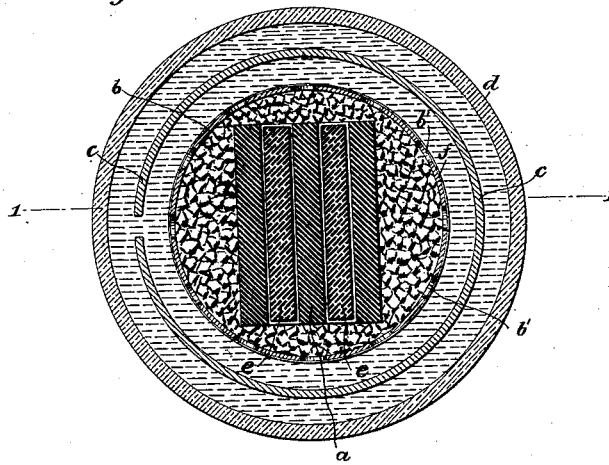
Figure 4:
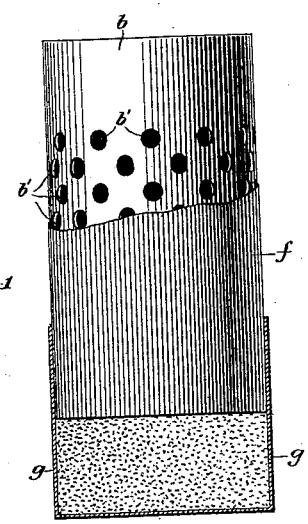

In the accompanying drawings, Figure 1 is a vertical section on the line 1 1 of a complete cell of a galvanic battery constructed according to my invention. Fig. 2 is a horizontal section of the same on the line 2 2, Fig. 1. Fig. 3 is a side elevation of the carbon plate or element, partly in section. Fig. 4 is a side elevation of the porous cup and covering and a sectional elevation of the receptacle for battery substances constructed according to my invention.

The battery shown in the drawings is of the single-fluid or sal-ammoniac type. The negative element consists of a carbon plate $a$, placed within a porous cell $b$. The positive element is a zinc plate $c$, located outside the porous cell. The porous cell and the elements are all held within a jar or cup $d$. The carbon plate $a$ is provided with slots, within which depolarizing material in cakes or plates of suitable shape or form may be arranged and thus virtually form part of the element or plate. I find that the depolarizing material when thus arranged is highly efficient and acts directly upon the plate to remove the hydrogen-bubbles therefrom. When my entire invention is used, the depolarizing material is in form to fit the slots in the carbon or negative element. The depolarizing substance when in this form is much more durable and efficient than the loose powder heretofore used, and may be more readily fitted to the elements, and when exhausted removed therefrom.

The slots $a'$ $a'$, above referred to, may be formed as shown, extending horizontally through the plate or element. Two of such slots are shown; but it is obvious that their number may be increased or diminished. Within each of these slots is placed depolarizing material $e$ in the form of a plate or cake, as aforesaid, which fits loosely in the slot, so that it may be readily inserted and removed. The depolarizing material preferred for this purpose is manganese dioxide.

The space between the carbon plate and the walls of the porous cell $b$ is filled nearly to the top of the cell with small pieces of carbon. The upper surface of this carbon filling is covered with a suitable sealing material—such as ordinary sealing-wax—having suitable vents or tubes $h$ $h$, provided for the escape of gases from within the cell.

The porous cell $b$ consists of a perforated cup of fluid-proofed stiff paper or card-board, covered by a thin and porous fabric extending over the perforations in the cup. Coarse heavy straw-board is a cheap and efficient material for the cup, and it is prepared for use by immersing it in a solution of paraffine or resinous or other fluid-proofing solution or by otherwise saturating or coating it with a fluid-resisting material. It can be made in one piece or of several pieces. In the latter case the various pieces are held together by sealing-wax or other suitable material. The perforations $b'$ $b'$ are formed in the side wall of the cup. These perforations are clearly shown in Fig. 4, a portion of the covering material of the cup being broken away for that purpose. This covering material or fabric $f$ preferably extends over the outer surface of the cup, covering the side wall and bottom of the cup and passing over the upper edge and down into the sealing material at the top of the cup. Cambric is a cheap and efficient material for this covering.

The porous cups made according to my invention are very cheap and of simple construction. The fluid-proofed card-board forms a stiff and strong cup, and the holes therein permit the battery-fluid to freely enter the porous cell through the fabric covering. The fabric covering prevents the carbon from escaping from the porous cell and prevents entry of any solid material from the outer cell, and also permits of larger perforations or of greater porosity in the cell.

The receptacle for battery materials consists of the cup $g$, shaped to fit over the lower part of the porous cup $b$. This cup $g$ is preferably made of coarse straw-board or other cheap material. When the batteries are transported in parts, the receptacle $g$ is partly filled with the battery material—such as sal-ammoniac—in the battery of the kind shown in the drawings, and the porous cup placed upon it so as to act as a cover for the receptacle. (Shown in Fig. 4.) In setting up the batteries it is only necessary to separate the porous cup from the receptacle and then pour the sal-ammoniac or other material into the battery-jar. The receptacle can then be thrown away. This construction provides a receptacle for battery-salts which is strong and tight and durable and which takes up little extra room when the parts of the battery are packed for transportation. The paper bags heretofore used very often spill their contents, as they break or work open in transportation. My improved receptacle is free from all these objectionable features, as it will not break or leak under the ordinary stress of packing and transportation. The receptacle is also very convenient for pouring the salts into the battery-jar.

A very great advantage which this form of battery has over the form now in use is that it produces a long-continued current and recuperates very rapidly, a fact which is partially due to the condition of the depolarizer. The carbon element can also be used without the cell and packing.

What I claim is—

1. A porous cell for galvanic batteries, consisting of a perforated cup of a stiff fluid-resisting paper, substantially as set forth.

2. A porous cell for galvanic batteries, consisting of a perforated cup of stiff fluid-resisting paper and of a covering of fibrous material, substantially as specified.

3. In a galvanic battery, the combination of a porous cell consisting of a perforated cup of a stiff fluid-resisting paper and of a covering of fibrous material with the carbon element, substantially as set forth.

4. In a galvanic battery, the combination of the carbon element, consisting of a carbon suitably slotted to receive a plate or plates of depolarizing material, and of one or more plates of depolarizing material fitted in the slot or slots, and of the carbon-filling material, with the cell consisting of a perforated cup of stiff fluid-resisting paper or analogous substance and of a covering of fibrous material, substantially as set forth.

5. In a galvanic battery, the combination of a porous cell, with the carbon element arranged within said cell and consisting of a carbon provided with one or more suitable slots, each adapted to receive a movable plate of depolarizing material, and of one or more plates of depolarizing material fitted in the slot or slots, and of a carbon filling surrounding said carbon, and of a suitable sealing material covering the mouth of said cup, substantially as set forth.

6. In a galvanic battery, the combination of the positive elements thereof with the negative elements, said negative elements being slotted to receive a removable piece of suitable depolarizing material, substantially as set forth.

7. A porous cell for a single-fluid galvanic battery, consisting of a perforated cup $b$, of stiff fluid-resisting paper, and the covering $f$, of fibrous material, substantially as set forth.

8. In a galvanic battery, the combination of the porous cell $b$ for a single-fluid battery, said cell consisting of a perforated cup of stiff fluid-resisting paper and of the covering $f$, of fibrous material, with the carbon element $d$ arranged within said cell and provided with suitable slots, into which the plates or cakes of depolarizing material $e$ fit, and of the carbon filling arranged within said cell $b$, and of the sealing material covering the mouth of the said cup, substantially as set forth.

9. In combination with a cup or cell of a galvanic battery, a receptacle for battery materials, consisting of a cap or cup adapted to fit the closed end of said battery-cell and be closed thereby, substantially as described.

WM. MACMILLAN.

Witnesses:
HENRY D. WILLIAMS,
LIVINGSTON EMERY.